A. A. EGENESS.
LOADING AND UNLOADING DEVICE.
APPLICATION FILED OCT. 29, 1907.
902,217.
Patented Oct. 27, 1908.
3 SHEETS—SHEET 1.
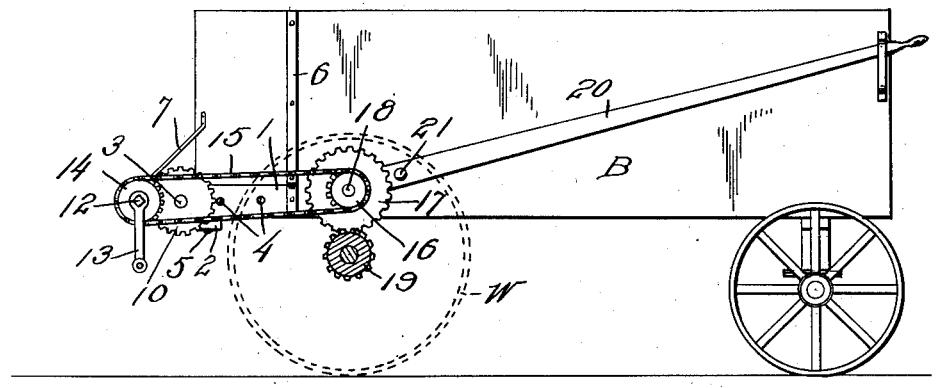
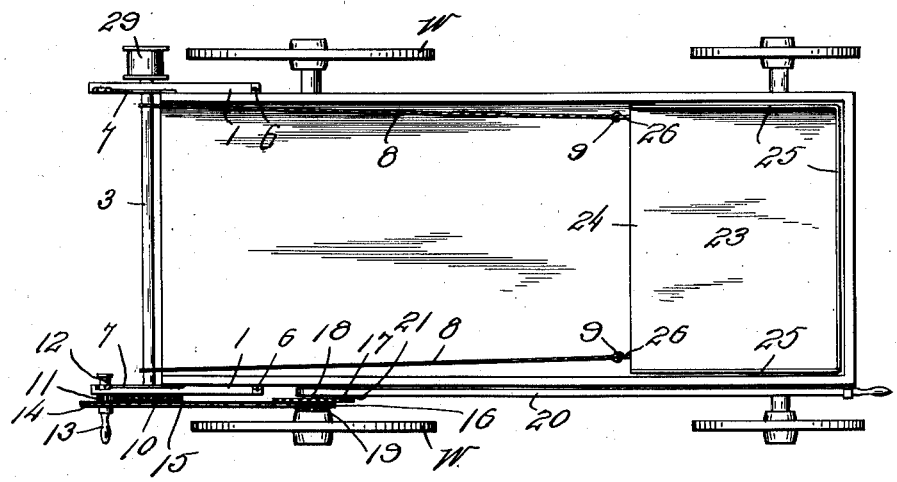
Witnesses
Inventor
Andrew A. Egeness
By Watson E. Coleman
Attorney

A. A. EGENESS.
LOADING AND UNLOADING DEVICE.
APPLICATION FILED OCT. 29, 1907.

902,217.

Patented Oct. 27, 1908.
3 SHEETS—SHEET 2.

Witnesses
Inventor
Andrew A. Egeness
By Watson E. Coleman
Attorney

A. A. EGENESS.
LOADING AND UNLOADING DEVICE.
APPLICATION FILED OCT. 29, 1907.
902,217.
Patented Oct. 27, 1908.
3 SHEETS—SHEET 3.
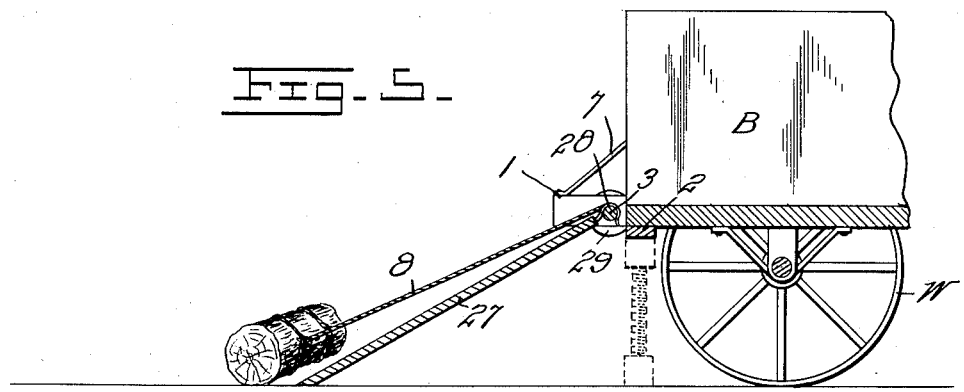
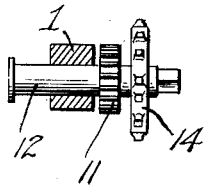
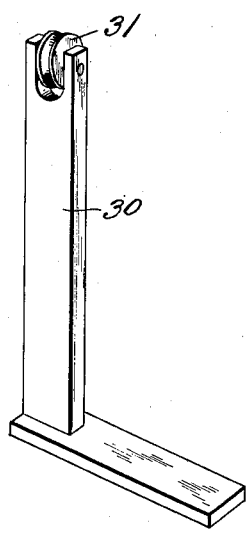
Witnesses
Inventor
Andrew A. Egeness
By Watson E. Coleman
Attorney

UNITED STATES PATENT OFFICE.

ANDREW A. EGENESS, OF ROOM, MINNESOTA.

LOADING AND UNLOADING DEVICE.

No. 902,217.  Specification of Letters Patent.  Patented Oct. 27, 1908.

Application filed October 29, 1907. Serial No. 399,673.

*To all whom it may concern:*

Be it known that I, ANDREW A. EGENESS, a citizen of the United States, residing at Room, in the county of Faribault and State of Minnesota, have invented certain new and useful Improvements in Loading and Unloading Devices, of which the following is a specification, reference being had to the accompanying drawings.

My invention relates to improvements in devices for loading and unloading wagons or the like, and more particularly to one in the form of an attachment which may be readily applied to an ordinary farm wagon and which will enable it to be quickly and easily loaded or unloaded, and also to be used as a fertilizer distributer, a stump puller and for other purposes.

The object of the invention is to provide a device of this character which will be simple, inexpensive, practical and efficient.

Figure 3:
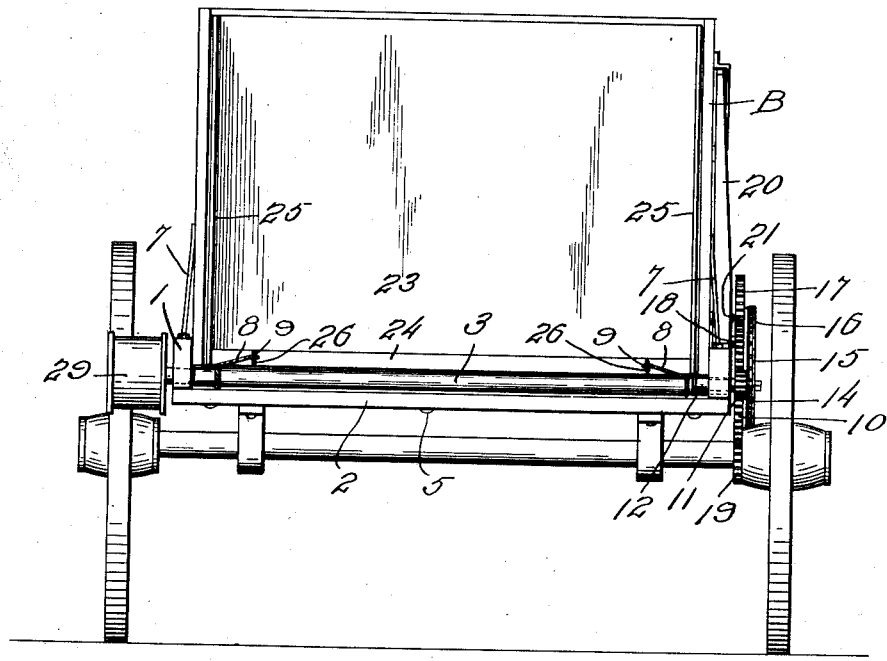
Figure 4:
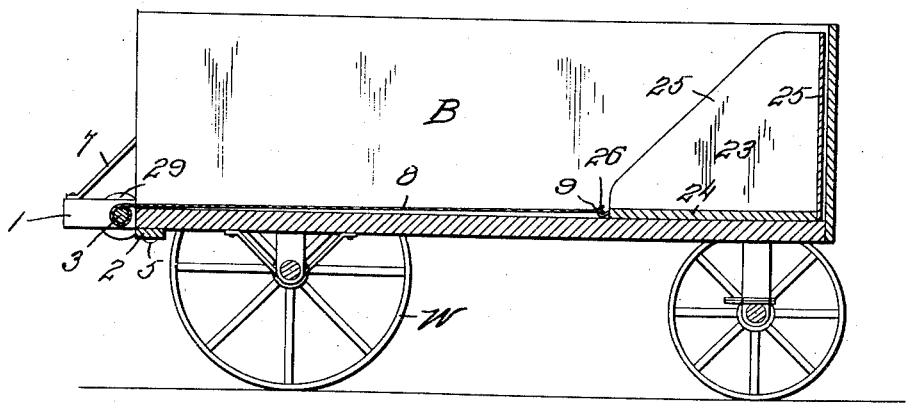

With the above and other objects in view, the invention consists of the novel features of construction and the combination and arrangement of parts hereinafter described and claimed and illustrated in the accompanying drawings, in which Figure 1 is a side elevation of a wagon showing my invention applied thereto; Fig. 2 is a top plan view of the same; Fig. 3 is a rear end elevation; Fig. 4 is a vertical longitudinal section showing the parts arranged for unloading the wagon or for use as a fertilizer distributer; Fig. 5 is a similar view showing the manner in which a log or other object may be loaded upon the wagon; Fig. 6 is a detail perspective of a modified form of follower for use in unloading the wagon; Fig. 7 is a detail view of a support which may be used when it is desired to hoist a shock of corn or the like into the wagon. and Fig. 8 is a detail sectional view showing the manner in which the stub shaft 12 is mounted.

While my invention may be built into and form a permanent part of a wagon or similar vehicle, I preferably make it in the form of an attachment which may be readily applied to farm wagons of standard sizes. It comprises two side bars 1 connected by a cross bar 2 and having journaled in suitable bearings in them a transverse shaft 3. The forward ends of the side bars are adapted to be bolted upon the outer faces of the upright sides of the wagon box or body B as shown at 4 and the cross bar 2 is adapted to be similarly secured to the bottom of the wagon body as shown at 5. Said side bars may be further secured by a strap 6 and by inclined braces 7. When said parts are applied to the wagon body the shaft 3 is arranged across the rear end of the latter and slightly below the plane of the upper surface of its bottom. Said shaft is adapted to be used as a drum or windlass and at suitable distances from its ends are secured cables or similar flexible elements 8 provided at their free ends with loops or eyes 9.

Fixed upon one of the ends of the shaft 3 is a gear 10 adapted to mesh with a pinion 11 fixed on a stub shaft 12 in the projecting rear end of one of the side bars or bracket arms 1. This stub shaft has a limited longitudinal sliding movement in its bearing so that the pinion 11 may be moved into and out of mesh with the gear 10 for the purpose of enabling the cables 8 to be wound upon the shaft 3 either by the hand crank 13 when said gears 10, 11 are in mesh, or by mechanism connected to the wheel axles, as hereinafter described, when said gears are not in mesh. Said shaft 3 may be also rotated for the purpose of winding the cables 8 thereon, by power obtained from one of the wheels of the wagon, and when this is desired the stub shaft 12 has fixed upon it a sprocket wheel 14 which is connected by a sprocket chain 15 to a sprocket wheel 16 carried by a gear 17 mounted on a stub shaft 18 carried by one end of a lever 20 pivoted on a horizontal pivot 21 so that the gear 17 may be raised out of mesh with or lowered into mesh with a gear 19 suitably fixed upon the hub of one of the wagon wheels W.

For the purpose of unloading grain, corn, or other loose material and for enabling the wagon to be used as a fertilizer distributer I provide a suitable follower 23 which I connect to the cables 8. This follower may be constructed as shown in Fig. 6 or as shown in Figs. 2, 3, and 4 of the drawings. In the last mentioned figures the follower is in the form of a scoop consisting of a bottom 24 having arranged upon three of its side edges upright walls 25. On the bottom 24 are arranged hooks 26 with which the loops 9 on the cables 8 may be engaged. In using this follower it is placed in the forward end of the body B of the wagon before it is loaded and the cables 8 are attached to it as more clearly shown in Fig. 2. When it is desired to unload grain, ear corn or other loose material the crank 13 is rotated to wind the cables 8 on the shaft 3 so that the follower will be drawn gradually in a rearward direction to force the load in rear of it out of the rear end of the wagon body. When the wagon is to be used as a fertilizer distributer the follower is placed in position before the fertilizer is deposited in the wagon and the shaft 3 is rotated from the wagon wheel W through the means of the intermediate gearing as will be readily understood.

When it is desired to load into the wagon, barrels, boxes, logs or the like I preferably employ a skid 27 having at its upper ends hooks 28 to take over the shaft 3 as shown in Fig. 5, and the cables 8 are suitably connected to the object to be moved up the skid so that when the shaft 3 is rotated by operating the crank 13 said object will be moved upon the skid and into the wagon body as the cables 8 are wound upon the shaft 3.

The device may be used for pulling stumps and for similar purposes by arranging the shaft 3 above the stump and attaching the cables 8 to the latter and then operating the crank to wind the cables on the shaft; and it may be used for lifting fence posts or the like and for stretching fence wire by arranging upon one end of the shaft 3 a drum 29 to which may be attached a hoisting cable or chain or the wire that is to be stretched. When the device is used in this manner the body of the wagon may be supported by one or more screw jacks or equivalent devices as indicated in dotted lines in Fig. 3.

In Fig. 7 of the drawings I have shown a support 30 which may be suitably mounted upon the wagon body or upon a hay rack or the like and which is provided with a pulley 31 to receive a hoisting cable adapted to have one of its ends attached to the drum 29 and its other end attached to a shock of corn or any other object or load which it is desired to hoist and load on to the wagon.

From the foregoing description taken in connection with the accompanying drawings it is thought that the construction, advantages and various uses of the invention will be readily understood without a more extended explanation.

Having thus described my invention what I claim is:

1. The combination with a wagon body, of a follower therein, a draft cable attached to the follower and a winding device for the cable operatively connected to one of the wheels of the wagon.

2. The combination with a wagon body, of a follower therein, a draft cable attached to the follower, a windlass for said cable, means for rotating said windlass and means whereby the windlass may be connected to and operated by one of the wheels of the wagon.

3. The combination with a wagon body, of a follower therein, a draft cable attached to the follower, a windlass for said cable, a gear for operating said windlass, hand operated means for actuating said gear, driving connections between said gear and one of the wheels of the wagon, and means for throwing said driving connections into and out of operation.

4. The combination with a wagon, of bearings at the rear of its body, a transverse shaft in said bearings, a follower, a flexible element attached to the follower and adapted to be wound up by the shaft and driving connections between the shaft and one of the wagon wheels.

5. The combination with a wagon, of bearings at the rear of its body, a transverse shaft in said bearings, a follower, a flexible element attached to the follower and adapted to be wound up by the shaft, a winding drum upon one end of said shaft, a gear upon the other end of said shaft, a hand crank for rotating said gear, driving connections between said gear and one of the wagon wheels and means for throwing said driving connections out of operation.

6. The combination with a wagon, of a follower therein, a winding shaft, draft cables between the latter and the follower, a gear upon said shaft and a second shaft carrying a pinion and a hand crank and mounted for longitudinal sliding movement whereby the pinion may be moved into and out of mesh with said gear.

7. The combination with a wagon, of a follower therein, a winding shaft, draft cables between the latter and the follower, a gear carried by one of the wheels of the wagon, a lever pivoted intermediate its ends, a gear journaled upon one end of the lever and adapted to be moved into and out of mesh with the gear upon the wheel, and driving connections between the gear upon the lever and said winding shaft.

In testimony whereof I hereunto affix my signature in the presence of two witnesses.

ANDREW A. EGENESS.

Witnesses:
B. O. ANDERSON,
O. J. CLARK.